(12) United States Patent
Tomono

(10) Patent No.: US 6,751,026 B2
(45) Date of Patent: Jun. 15, 2004

(54) HEAD-MOUNTED DISPLAY

(75) Inventor: Takao Tomono, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/673,435

(22) Filed: Sep. 30, 2003

(65) Prior Publication Data

US 2004/0085648 A1 May 6, 2004

(30) Foreign Application Priority Data

Nov. 6, 2002 (KR) .................................. 10-2002-0068367

(51) Int. Cl.[7] .............................................. G02B 27/14
(52) U.S. Cl. ................................ 359/630; 345/7; 345/8
(58) Field of Search ................................ 359/630, 618; 349/11, 95, 515; 345/7, 8

(56) References Cited

U.S. PATENT DOCUMENTS 6,329,964 B1 * 12/2001 Tanaka .......................... 345/8

* cited by examiner

Primary Examiner—Hung X. Dang
(74) Attorney, Agent, or Firm—Sughrue Mion, PLLC

(57) ABSTRACT

A head-mounted display (HMD) using retinal direct projection that provides a small size and lightweight by changing the configuration of optical components and optical arrangement. The HMD includes: a planar backlight for producing and emitting planar light; a light-speed controlling element positioned in front of the planar backlight for controlling the speed of incident light so that the light propagates parallel or near parallel to an optical axis; an image-forming element disposed in front of the light-speed controlling element for forming an image; and a Fresnel lens placed in front of the image-forming element for focusing the incoming incident onto an eyeball.

8 Claims, 3 Drawing Sheets

HEAD-MOUNTED DISPLAY

BACKGROUND OF THE INVENTION

This application claims priority from Korean Patent Application No. 2002-68367, filed Nov. 6, 2002, the content of which is incorporated herein by reference in its entirety.

1. Field of the Invention

The present invention relates to a head-mounted display (HMD) designed to view video images when mounted on a user's head, and more particularly, to a head-mounted display using retinal direction projection, which has a small and lightweight structure by changing the configuration of optical elements and optical arrangement.

2. Description of the Related Art

In general, head-mounted displays (HMDs) appear in the form of eyeglasses or helmets. A HMD is a personal see-through device designed to view video images only when a user wears it. The HMD may use a magnifier, an optical relay lens, or retinal direct projection technology depending on the optical system configuration.

While a magnifier approach can produce a virtual image with a large field of view through a very small magnifier lens, it increases eye fatigue. A HMD using a relay lens reduces eye fatigue because a viewer can observe an image displayed on the screen from a distant position, but its size is too large for helmets. A retinal direct projection technique that has an image displayed on the screen directly projected onto the retina not only reduces eye fatigue but also makes the size of a display smaller than when the relay lens is used.

FIG. 1 shows a conventional HMD using retinal direct projection technology disclosed in Japanese Patent Laid-Open Publication No. Hei 3-214872 (Sep. 20, 1991).

Referring to FIG. 1, the conventional HMD includes a point light source 1 consisting of a tungsten lamp, a condensing lens 2 for condensing light emitted from the point light source 1, a plurality of reflecting mirrors 3 and 4 for converting the path of incident light, eyepieces 5, 7, and 8 consisting of three element lenses, and an image plate 6 positioned between the eyepieces 5 and 7 for producing an image by selectively transmitting the incident light. This HMD device focuses the image irradiated from the point light source 1 and produced by passing through the transmissive image plate 6 at the focal point of an eyeball 9.

However, as described above, the conventional HMD is not of small size and lightweight structure because it requires a plurality of optical components such as condensing lens 2, reflecting mirrors 3 and 4, and eyepiece 5 between the point light source 1 and image plate 6.

SUMMARY OF THE INVENTION

The present invention provides a small, lightweight head-mounted display by changing the configuration of optical components and optical arrangement.

According to the present invention, there is provided a head-mounted display including: a planar backlight for producing and emitting planar light; a light-speed controlling element disposed in front of the planar backlight for controlling the speed of incident light so that the light propagates parallel or near parallel to an optical axis; an image-forming element disposed in front of the light-speed controlling element for forming an image; and a Fresnel lens disposed in front of the image-forming element for focusing the incident image onto an eyeball.

BRIEF DESCRIPTION OF THE DRAWINGS

The above aspects and advantages of the present invention will become more apparent by describing in detail illustrative, non-limiting embodiments thereof with reference to the attached drawings in which.

DETAILED DESCRIPTION OF THE INVENTION

Head-mounted displays (HMDs) according to the illustrative, non-limiting embodiments of this invention will now be described in detail with reference to the accompanying drawings.

Figure 1:
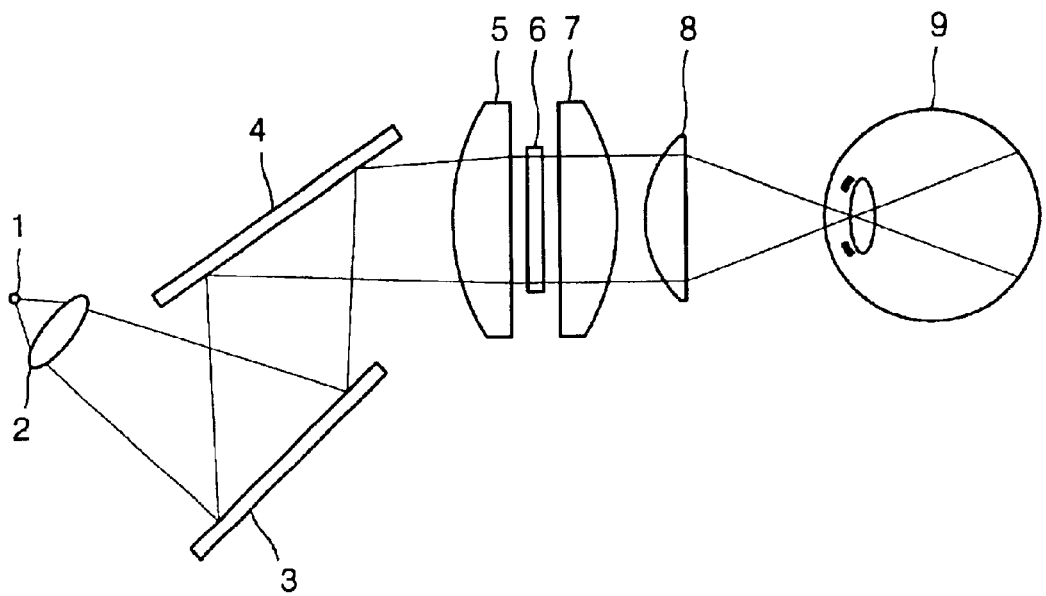
FIG. 1 shows the optical arrangement of a conventional head-mounted display (HMD)
Figure 2:
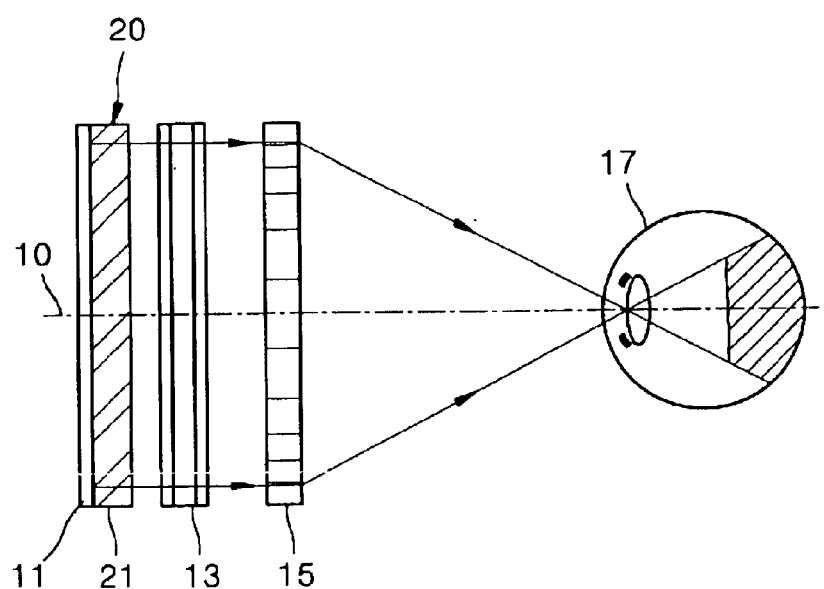
FIG. 2 shows the optical arrangement of a HMD according to a first embodiment of the present invention.

Referring to FIG. 2, a HMD according a first embodiment of this invention includes a planar backlight 11 that produces and emits planar light, a light-speed controlling element 20 that controls the speed of incident light and collimates the incident light, an image-forming element 13 that selectively transmits the collimated light in order to form an image, and a Fresnel lens 15 that focuses and transmits the incident image onto an eyeball 17.

The planar backlight 11, which is a light source for producing and emitting planar light, is preferably a light-emitting element formed from organic or inorganic electroluminescence (EL) material on a plane. For the planar backlight 11, it is also possible to adopt a backlight consisting of a linear light source on the side and a light guide plate that produces a planar light.

The light-speed controlling element 20 is an orientation layer disposed in front of the planar backlight 11 and has the incident light directed in a single direction. That is, the light-speed controlling element 20 makes the diverging light from the planar backlight 11 into light parallel to an optical axis 10 or light diverging at about 2 degrees with respect to the optical axis 10. FIG. 2 shows an example in which a holographic element 21 is used as the light-speed controlling element 20. The holographic element 21 diffracts the incident light through a produced hologram pattern into a parallel beam.

The image-forming element 13 is disposed in an optical path between the light-speed controlling element 20 and Fresnel lens 15. The image-forming element 13 is driven on a pixel-by-pixel basis to form an image by selectively transmitting the incident collimated light. The image-forming element 13 is preferably a transmissive liquid crystal display (LCD). Since the transmissive LCD is well known in the art, a detailed description will be omitted. The Fresnel lens 15 located in front of the image-forming element 13 focuses the incident image onto an eyeball 17.

Figure 3:
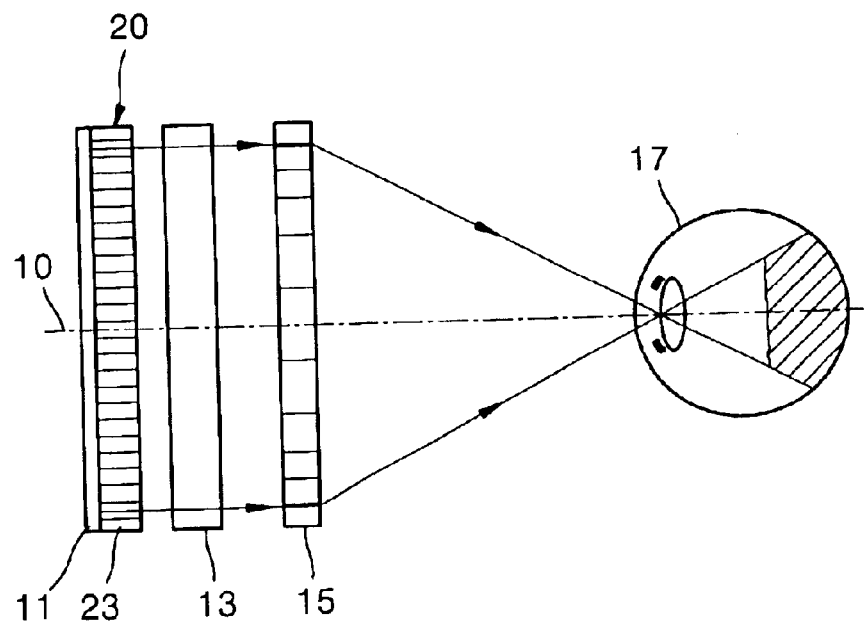
FIG. 3 shows the optical arrangement of a HMD according to a second embodiment of the present invention.

Referring to FIG. 3, a HMD according to a second embodiment of this invention consists of substantially the same optical components as described with reference to FIG. 2. The difference is that a rubber film 23 is used as the light-speed controlling element 20. The rubber film 23 possessing a high index of refraction refracts the light incident from the planar backlight 11 at the angle of refraction less than the angle of incidence, thereby increasing the directivity of incident light.

Figure 4:
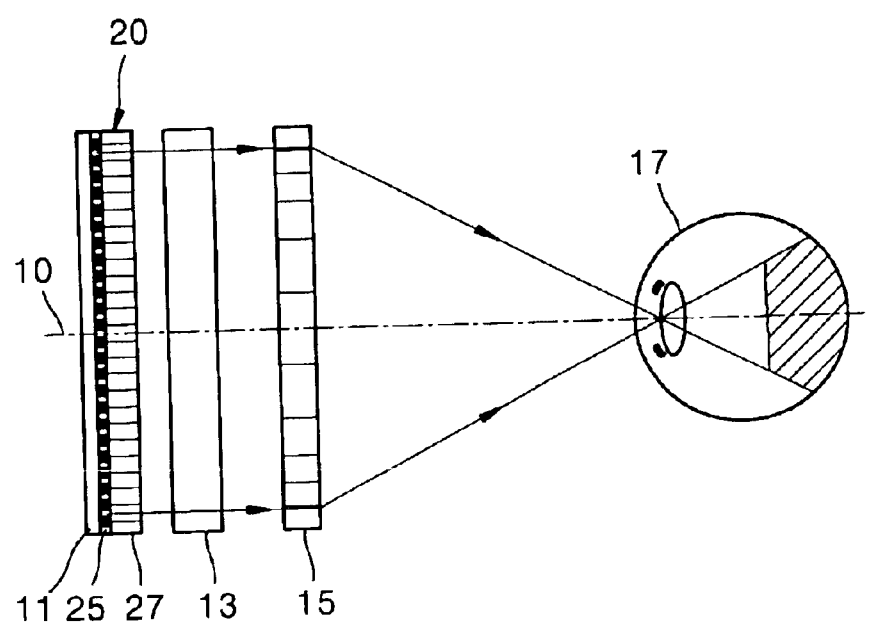
FIG. 4 shows the optical arrangement of a HMD according to a third embodiment of the present invention.
Figure 5:
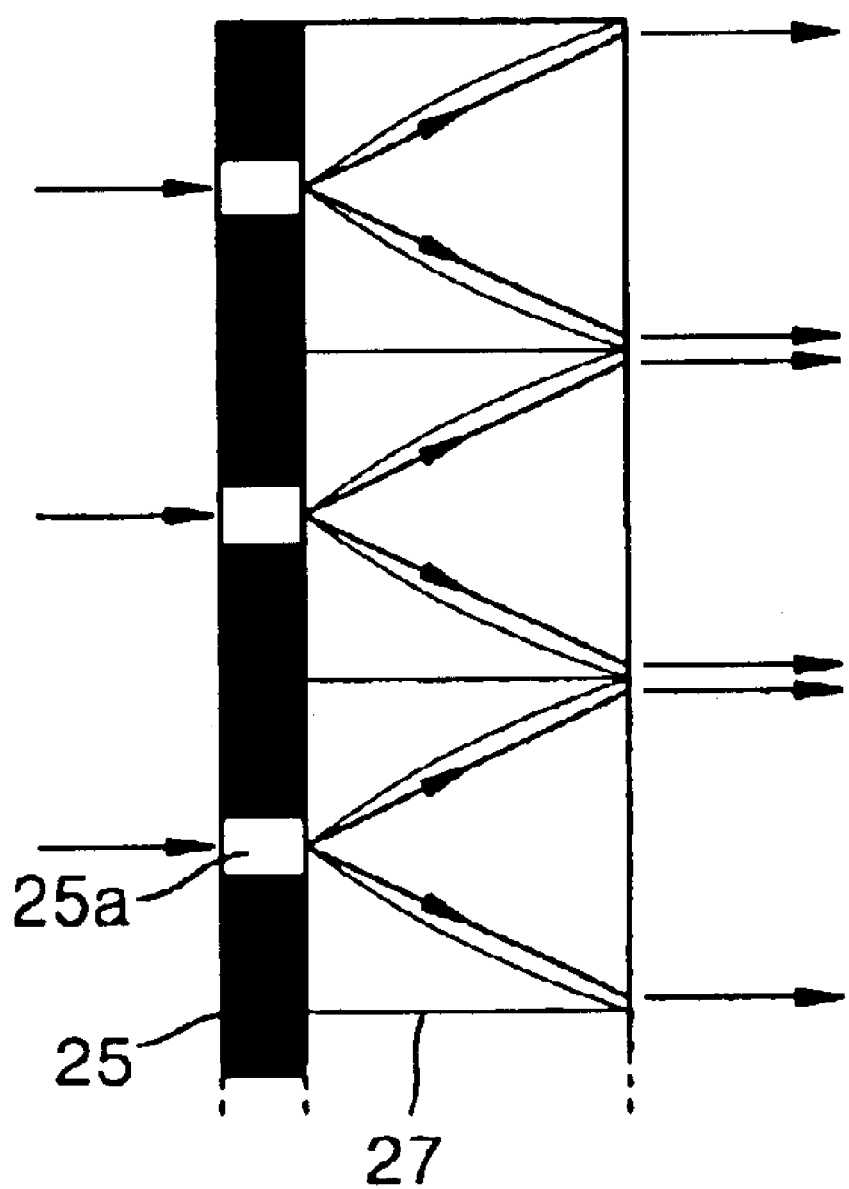
FIG. 5 schematically shows a part of the pinholes array and microlens array shown in FIG. 4.

Referring to FIGS. 4 and 5, optical components of a HMD according to a third embodiment of this invention are also substantially the same as those described with reference to FIG. 2. The difference is that a pinhole array 25 and a microlens array 27 are used as the light-speed controlling element 20. The pinhole array 25 consists of a plurality of pinholes 25a disposed on the plane to transmit the incident light. The light passing through the pinholes 25a is diffracted and diverged, and condensed by the microlens array 27 into light parallel to the optical axis 10. The microlens array 27 is preferably a graded index lens having a planar surface of incidence/refraction to condense the incident light. The microlens array 27 can also be constructed to have an embossed plane of incidence and/or reflection.

As described above, HMDs according to this invention allow the image to be projected onto the retina at the back of the eyeball, thus reducing eye fatigue. Furthermore, this invention provides a small, lightweight HMD by adopting the planar backlight, light-speed controlling element, and Fresnel lens as optical components. Thus, this HMD can be designed in the form of eyeglasses so is easy to wear.

What is claimed is:

1. A head-mounted display comprising:
   a planar backlight for producing and emitting planar light,
   a light-speed controlling element disposed in front of the planar backlight for controlling a speed of incident light so that the incident light propagates parallel or substantially parallel to an optical axis;
   an image-forming element disposed in front of the light-speed controlling element for forming an image; and
   a Fresnel lens disposed in front of the image-forming element for focusing the image onto an eyeball.

2. The head mounted display of claim 1, wherein the light-speed controlling element is a holographic element that diffracts the incident light so that the incident light propagates parallel to the optical axis or diverges substantially parallel to the optical axis.

3. The head-mounted display of claim 1, wherein the light-speed controlling element is a rubber film that refracts the incident light from the planar backlight at an angle of refraction less than an angle of incidence.

4. The head-mounted display of claim 1, wherein the light-speed controlling element includes a pinhole array having a plurality of pinholes that transmit the incident light from the planar backlight and a microlens array that condenses the incident light transmitted through the plurality of pinholes.

5. The head-mounted display of claim 1, wherein the planar backlight is a light-emitting element that includes at least one of the following:
   organic and inorganic electroluminescence (EL) material.

6. The head-mounted display of claim 1, wherein the image-forming element is a transmissive liquid crystal display.

7. A head-mounted display comprising:
   a backlight that emits a planar light;
   a light controlling element that transmits incident light of the planar light so that the incident light propagates parallel or substantially parallel to an optical axis;
   an image-forming element that forms an image from the incident light transmitted from the light controlling element; and
   a lens that focuses the image onto an eyeball of a user.

8. The head-mounted display of claim 7, wherein the lens is a Fresnel lens.

* * * * *